Aug. 22, 1967 — EUGENIE NITTEL NÉE KRAUSE — 3,337,716
HEATING STRUCTURE, PARTICULARLY FOR WELDING PLASTICS
Filed Nov. 4, 1964

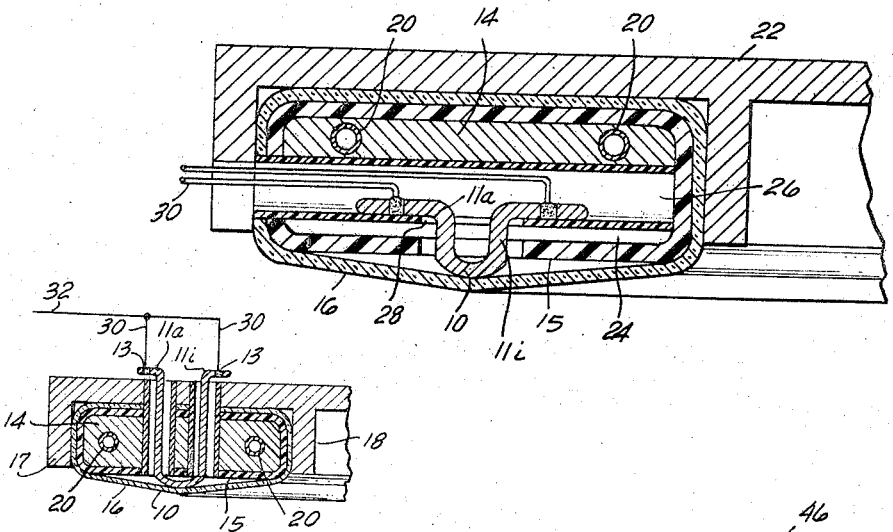
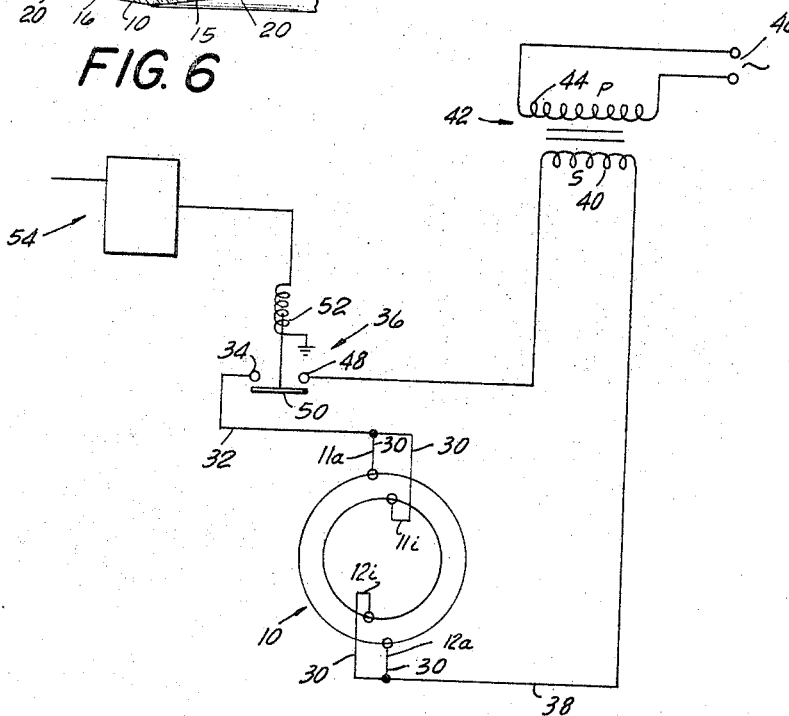

United States Patent Office 3,337,716
Patented Aug. 22, 1967

3,337,716
HEATING STRUCTURE, PARTICULARLY FOR WELDING PLASTICS
Eugenie Nittel, nee Krause, 18 Kelsterbacherstr., Raunheim 6096, Germany
Filed Nov. 4, 1964, Ser. No. 408,806
9 Claims. (Cl. 219—541)

ABSTRACT OF THE DISCLOSURE

An arrangement for heating uniformly an endless heating element applied to the seaming of plastic materials. The heating element and contacts conducting current to the element are formed integrally of a single body of material. The electrical contacts conducting current to the heating element are located diametrically opposite of the endless heating element when in circular form. Each electrical contact is equipped with two portions located adjacent to each other but angularly displaced from one another. The two portions of each contact are, furthermore, situated on opposite sides of the heating element. Thus, one portion of each electrical contact may be located on the inner side of the heating element, while the other portion may be located on the outer side of the endless heating element, when in circular form. This particular construction of the heating element and the electrical contacts provides uniform distribution of current through the heating element and hence uniform heating of all cross sections of the heating element.

---

The present invention relates to welding structures and in particular to structures for welding plastics.

While the welding of plastics is in general well known, particular problems are encountered in welding together a pair of plastic elements along an endless path. Up to the present time it has not been possible to provide with an apparatus which responds to a single heating impulse an endless welded seam between a pair of plastic members. The reason for this is that a structure of this type which generally includes an endless heating element cannot have the heating element uniformly heated, with the result that the welding of the plastic elements along an endless seam is not uniform. Primarily the reason why it has not yet been possible to provide satisfactory welding of plastics along endless seams with a structure of the above type is that the electrical connection to the endless heating element unavoidably provides cross sectional variations in the path of current flow with the result that non-uniform heating providing cold and hot spots are encountered, and although it has been attempted to solve this problem as by providing a plurality of electrical connection to a heating element, up to the present time this problem has not been solved. For example, it has already been proposed to successively heat during different time periods different portions of an endless heating element with these portions overlapping each other so that a certain preheating and subsequent heating of portions of the heating element will take place in a manner which should theoretically achieve a fairly uniform welded seam, nevertheless it has been found in practice that such a solution to the problem while extremely expensive because of the special complex electrical connections does not actually provide a satisfactory solution since experience has shown that in practice the welded seam still does not have the desired uniformity.

It is therefore, a primary object of the present invention to provide a plastic welding structure which is capable in response to a single heating impulse of providing a faultless endless welded seam between plastic members.

In addition it is an object of the invention to provide a welding structure of this type which requires only simple electrical connections and which is quite inexpensive.

Furthermore, it is an object of the invention to provide a heating structure which can conveniently be incorporated into a press in which plastic elements are welded together.

Furthermore, it is an object of the invention to provide a plastic welding structure capable of providing a high quality welded seam which gradually merges into the plastic elements which are welded to each other.

With these objects in view the invention includes, in an assembly for welding plastic elements, an endless electrically conductive heating element and a pair of diametrically opposed electrical connection means fixed thereto, each electrical connection means including a pair of portions located adjacent but angularly displaced with respect to each other along the heating element. In accordance with the invention both of the electrical connection means and the heating element form a single, one-piece structure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a transverse section of the structure of FIG. 3 taken along the lines of 4—4 of FIG. 3 in the direction of the arrows;

FIG. 5 is a wiring diagram illustrating how the heating element of the invention is connected into an electrical circuit; and FIG. 6 is a transverse sectional view, on a smaller scale than FIG. 4, showing another embodiment of the structure of FIG. 4.

Figure 1:
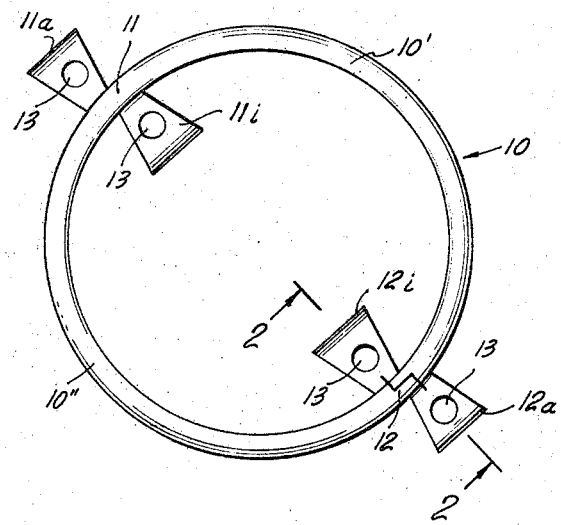
FIG. 1 is a plan view of the heating element and electrical connection means of the invention.

Referring to FIG. 1, there is shown therein an endless electrically conductive heating element 10 which in the illustrated example has the configuration of a circle. A pair of electrical connection means 11 and 12 are situated at diametrically opposed parts of the heating element 10 and are fixed thereto. Each electrical connection means consists of a pair of conductor portions respectively situated on opposite sides of the heating element 10. Thus, the connection means 11 includes the electrically conductive portions 11a and 11i which have the tapered configuration illustrated in FIG. 1 so that the widest ends of these portions are most distant from the side edges of element 10 to which the portions 11a and 11i respectively are connected. In the same way the opposite electrical connection means 12 has a pair of electrically conductive portions 12a and 12i which may be identical with the portions 11a and 11i, respectively. In accordance with an important feature of the invention, the pair of electrically conductive portions 11a and 11i while adjacent to each other are nevertheless angularly offset with respect to each other and the same is true of the electrically conductive portions 12a and 12i. In this way the endless heating element 10 is divided into a pair of heating element halves 10′ and 10″ each of which forms a seamless extension of the other in the sense that these halves are integral and are not connected to each other by any seam or the like. The cross sections of the endless heating element 10 at the regions where the electrical connection means 11 and 12 are joined thereto are identical with the cross section at any other part of the heating element 10, so that at the transition region between the pair of electrical connection means 11 and 12 and the heating element 10 there is no change in the cross section of the latter. All of the electrically conductive portions 11a, 11i, 12a and 12i, and the heating element 10 form a single one-piece structure.

Figure 2:
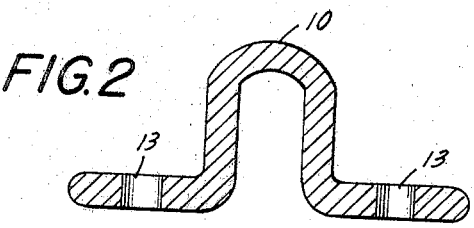
FIG. 2 is a transverse section of the structure of FIG. 1 taken along the line 2—2 of FIG. 1.

As may be seen from FIG. 2, each electrical connection means has its offset extensions extending from opposed side edge portions of element 10 to an elevation different from that of the element 10 and at their outer ends the conductive portions of each electrical connection means are formed with openings 13 to which electrical conductors are connected. Because of the manner in which the extensions 11a, 11i, 12a, 12i, project away from the heating element 10, the underside of the heating element 10 which is directed toward the work is absolutely uniform along the entire length of the heating element 10. This underside of the heating element 10 is preferably of a convex curvature. As a minimum, the side edges of the endless heating element 10 are rounded so that in this way on both sides of the welded seam there will be a transition region where the welded seam gradually merges into the plastic elements which are welded to each other and in this way the strength of the seam is enhanced.

The material used for the one-piece structure which includes the heating element 10 and the pair of diametrically opposed electric connection means 11 and 12 is a material which has particularly good resistance to corrosion and heat, such as, for example, a slightly carburized chrome-nickel-steel.

Figure 3:
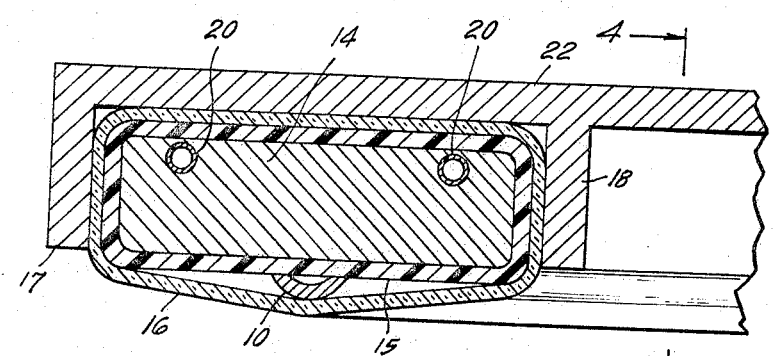
FIG. 3 is a fragmentary sectional elevation of a press member provided with the structure of the invention.

As is indicated in FIGS. 3 and 4, the unitary structure of FIGS. 1 and 2 is adapted to form part of a pressure member of a press in which a pair of plastic elements are welded to each other, and FIGS. 3 and 4 fragmentarily illustrate the upper part of the press which moves downwardly toward the base on which the plastic elements which are to be welded to each other are situated. The structure of FIGS. 1 and 2 forms part of a ram which is hydraulically or pneumatically actuated so as to be moved into and out of engagement with the work material. The part of the press which is fragmentarily illustrated in FIGS. 3 and 4 includes a rigid support means 14 for the heating element 10, this support means 14 being insulated from the heating element 10 and being a good conductor of heat. As is indicated in FIGS. 3 and 4, the element 14 can be in the form of a casting which is poured in a suitable mold about a pair of pipes 20 which communicate with each other and with a source of a suitable cooling fluid, so that in this way a cooling fluid can flow through the support means 14. The exterior surface of the support means 14 is covered with a layer of electrical insulation 15. Furthermore, the support means 14 with the layer of insulation 15 is enveloped within an annular sheet 16 which also extends around the heating element 10 so as to hold the latter against the underside of the insulated layer 15. The heating element 10 is supported with this structure in such a way that it is free to move in response to expansion and contraction during heating and cooling of element 10, respectively. The enveloping sheet 16 is also made of a material which has a high resistance to heat. It is preferred to use for the sheet 16 a woven glass fabric which is impregnated with a polymeric halogenated hydrocarbon. This assembly is carried by an outer ring 17 and an inner ring 18 which depend from and are fixed to the plate 22 which is in turn fixed in the well known manner to the piston of the hydraulic or pneumatic assembly which moves the structure of FIGS. 3 and 4 up and down. The material with which the woven glass fabric envelope 16 is impregnated is, for example, Teflon. Thus, with the structure shown in FIGS. 3 and 4 the structure of FIGS. 1 and 2 is incorporated into the plunger of the welding machine.

As may be seen from FIG. 4, the support means 14 is formed with a radial notch 24 extending upwardly into the same from its underside, and at this radial notch there is fixed to the support means 14 an elongated tubular member 26 of electrically non-conductive material such as a suitable plastic, and this member 26 is formed with an opening 28, and the extensions 11i and 11a extend through the opening 28 into the tubular member 26. There is in the opening 28 a sufficient clearance for the extensions 11a and 11i to enable the element 10 to move freely in response to expansion and contraction. The portions of the insulation 15 and envelope 16 which are aligned with the left end of the tubular member 26, as viewed in FIG. 4, are formed with openings and the outer ring 17 is also formed with an opening aligned with the left end of the tubular member 26, as viewed in FIG. 4, so that in this way cables 30 can extend into the tubular member 26 to be connected with the extensions 11a and 11i, as indicated in FIG. 3.

At a part of the assembly which is diametrically opposed to that shown in FIG. 4, the structure of FIG. 4 is also provided to accommodate the electrical connection means 12.

The embodiment of FIG. 6 is the same as that of FIG. 4 except that the portions 11a and 11i extend upwardly through passage ways lined with insulation to be connected to the conductors in the manner shown in FIG. 6, and of course the construction for the portions 12a and 12i is the same.

Referring now to FIG. 5, it will be seen that the cables 30 of the electrical connection means 11 are connected to a conductor 32 which is in turn connected with an element 34 of a switch 36, while the cables 30 of the electrical connection means 12 are both connected to a conductor 38 which is connected with the secondary coil 40 of a transformer 42 which includes the primary coil 44 connected to the lines at 46. The other end of the secondary coil 40 is connected with the contact 48 of the switch 36 which includes a switch member 50 which can be displaced into engagement with contacts 34 and 48 for closing the switch 36. A relay coil 52 is connected operatively with the switch member 50 for closing the switch 36 when the relay coil 52 is energized, and for this purpose the relay 52 is included in the circuit of a control assembly 54 which in a known way will at proper moments during the cycle of operations of the welding machine close the circuit of the coil 52 for energizing the latter so as to close the switch 36 for a relatively short period of time during which current will flow through the heating element 10 so as to provide the heating impulse which causes the pair of plastic members to fuse together to form the welded seam.

The problems encountered in the art, as set forth in the introduction, are solved in the best possible manner with the above-described structure of the invention. The most careful examination of a welded seam provided with the structure of the invention will fail to indicate where the electrical connection means 11 and 12 are situated, so that with the structure of the invention it is possible to achieve an absolutely uniform welded seam. The feature acording to which the heating element 10 and the pair of electrical connection means 11 and 12 are formed from a single body of material, preferably by being sawed or otherwise cut from a single sheet of metal, contributes to the results achieved with the invention, and it has been found that with the structure of the invention the disadvantages of undesirable heat travel and lack of uniformity in the welded seam are completely avoided.

Because it is possible to saw or otherwise cut the heating element and the electrical connections therefor from a single sheet metal member, the endless heating element of the invention can have any desired configuration including polygonal configurations provided with sharp corners. The heating element of the invention has a particularly long life. Of course, if it is not absolutely essential to have a perfectly uniform welded seam, it is possible to construct the heating element of the invention from a plurality of individual components which may be soldered to each other, for example, but with such a structure the results achieved will not equal those which are achieved with a heating element and electrical connection means cut from a single sheet of metal.

It will be understood that each of the elements described above, or two or more together, may also find a useful application in other types of welding structures differing from the types described above.

While the invention has been illustrated and described as embodied in structures for welding plastics, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the stanadpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an assembly for welding plastics, in combination, an elongated electrically conductive endless heating element; and a pair of diametrically opposed electrical connection means fixed to said heating element for connecting the latter into an electrical circuit, each of said electrical connection means including pair of electrically conductive portions contacting said heating element and located adjacent but angularly offset with respect to each other on opposite sides of said endless heating element for leading current into said heating element at opposite sides thereof, and said heating element and pair of electrical connection means forming a one-piece structure with said pair of connection means integrally connected with said heating element, whereby said heating element is uniformly heated throughout its length through uniform distribution of electrical current within said heating element.

2. In an assembly as recited in claim 1, said heating element and pair of electrical connection means all being formed from a single piece of sheet metal.

3. In an assembly as recited in claim 1, each of said electrical connection means including a pair of extensions of said heating element extending away from the latter to an elevation different from that of said heating element.

4. In an assembly as recited in claim 1, said heating element consisting of a slightly carburized chrome-nickel-steel.

5. In an assembly for welding plastics, in combination, a one-piece structure including an endless conductive heating element and a pair of diametrically opposed electrical connection means fixed to and extending from said heating element with each electrical connection means including a pair of electrically conductive portions contacting said heating element and angularly displaced with respect to each other along said endless heating element but located adjacent each other on opposite sides of said endless heating element for leading current into said heating element at opposite sides thereof; and a rigid support means of good heat conductivity carrying said one-piece structure and electrically insulated therefrom, and said support means supporting said one-piece structure for movement relative to said support means, whereby said heating element is uniformly heated throughout its length through uniform distribution of electrical current within said heating element.

6. In an assembly as recited in claim 5, said support means being formed with passages through which a cooling medium is adapted to flow.

7. In an assembly for welding plastics, in combination, an endless electrically conductive heating element surrounding a predetermined axis and having a convexly curved surface extending between side edges of said heating element and adapted to be directed toward the plastic which is to be welded; and a pair of diametrically opposed electrical connection means integrally connected with and extending from said heating element, each of said connection means including a pair of electrically conductive extensions respectively extending from said edges of said heating element, located adjacent but angularly offset with respect to each other, and extending from said heating element to an elevation different from that of said heating element.

8. In an assembly as recited in claim 7, each of said extensions having a relatively narrow end at an edge of said heating element, a relatively wide end distant therefrom, and tapering from said wide to said narrow end thereof.

9. In an assembly as recited in claim 8, and wherein each of said extensions has an L-shaped configuration.

References Cited
UNITED STATES PATENTS

| | | | |
|---|---|---|---|
| 2,714,416 | 8/1955 | Fener | 219—243 X |
| 3,133,846 | 5/1964 | Gandy | 219—243 X |
| 3,166,459 | 1/1965 | Imhof | 156—380 |
| 3,170,275 | 2/1965 | Rohdin et al. | 53—373 |

RICHARD M. WOOD, Primary Examiner.

V. Y. MAYEWSKY, Assistant Examiner.